United States Patent
Hayakawa (10) Patent No.: US 12,103,524 B1
(45) Date of Patent: Oct. 1, 2024

(54) DRIVING CONTROL METHOD AND DRIVING CONTROL DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/693,059

(22) PCT Filed: Sep. 21, 2021

(86) PCT No.: PCT/JP2021/034533
§ 371 (c)(1),
(2) Date: Mar. 18, 2024

(87) PCT Pub. No.: WO2023/047453
PCT Pub. Date: Mar. 30, 2023

(51) Int. Cl.
*B60W 30/16* (2020.01)
*B60W 30/095* (2012.01)
*B60W 30/12* (2020.01)

(52) U.S. Cl.
CPC ........ *B60W 30/0956* (2013.01); *B60W 30/12* (2013.01); *B60W 30/16* (2013.01); *B60W 2554/80* (2020.02)

(58) Field of Classification Search
CPC ... B60W 30/12; B60W 30/16; B60W 2554/80
See application file for complete search history.

(56) References Cited

U.S. PATENT DOCUMENTS

| | | | |
|---|---|---|---|
| 2015/0197249 A1* | 7/2015 | Sakima | B60W 30/16 701/96 |
| 2018/0345959 A1 | 12/2018 | Fujii | |
| 2019/0071101 A1* | 3/2019 | Emura | G05D 1/0088 |
| 2019/0300053 A1 | 10/2019 | Mizoguchi | |
| 2019/0324451 A1* | 10/2019 | Obata | B60W 40/04 |
| 2020/0207346 A1 | 7/2020 | Tsuji et al. | |
| 2020/0247400 A1 | 8/2020 | Fujii | |
| 2020/0307569 A1 | 10/2020 | Yasui et al. | |
| 2020/0317227 A1* | 10/2020 | Fukamachi | B60W 60/0051 |
| 2020/0346667 A1 | 11/2020 | Kanoh | |
| 2021/0034059 A1* | 2/2021 | Nagata | G05D 1/0285 |
| 2022/0118971 A1 | 4/2022 | Fujii | |

FOREIGN PATENT DOCUMENTS

| | | |
|---|---|---|
| JP | 2018-203101 A | 12/2018 |
| JP | 2019-172239 A | 10/2019 |
| JP | 2020-104802 A | 7/2020 |
| JP | 2020-158048 A | 10/2020 |
| WO | 2019/150525 A1 | 8/2019 |

* cited by examiner

*Primary Examiner* — Anshul Sood
(74) *Attorney, Agent, or Firm* — Young Basile Hanlon & MacFarlane, P.C.

(57) ABSTRACT

A processor of a driving control device compares a vehicle speed of a subject vehicle traveling in a first lane with a vehicle speed of an adjacent other vehicle traveling in a second lane to determine whether a relative speed of the adjacent other vehicle to the subject vehicle is equal to or less than a predetermined speed difference threshold, and relaxes a travel condition for permitting the subject vehicle to travel at a predetermined driving assistance level when the relative speed is equal to or less than the speed difference threshold.

11 Claims, 5 Drawing Sheets

DRIVING CONTROL METHOD AND DRIVING CONTROL DEVICE

TECHNICAL FIELD

The present invention relates to a driving control method and a driving control device.

BACKGROUND

In a driving control method disclosed in JP 2020-104802 A, driving of a subject vehicle is controlled at a predetermined driving assistance level such that the subject vehicle follows a preceding vehicle, and the driving assistance level is decreased when a moving amount in the lateral direction of the preceding vehicle is greater than a predetermined value.

SUMMARY

However, in the driving control method disclosed in JP 2020-104802 A, there is a problem that since the driving assistance level corresponding to only a traveling environment of a current lane is set, an opportunity to set the predetermined driving assistance level is limited.

A problem to be solved by the present invention is to provide a driving control method and a driving control device capable of increasing an opportunity to set a predetermined driving assistance level.

The present invention solves the above-described problem by comparing a vehicle speed of a subject vehicle with a vehicle speed of an adjacent other vehicle traveling in an adjacent lane and relaxing a travel condition for permitting the subject vehicle to travel at a predetermined driving assistance level when a relative speed of the adjacent other vehicle to the subject vehicle is equal to or less than a predetermined speed difference threshold.

According to the present invention, since the travel condition is relaxed when the relative speed of the adjacent other vehicle to the subject vehicle is equal to or less than the speed difference threshold, an effect that the opportunity to set the predetermined driving assistance level can be increased is provided.

DETAILED DESCRIPTION

Embodiments of the present invention will be described below with reference to the drawings.

Figure 1:
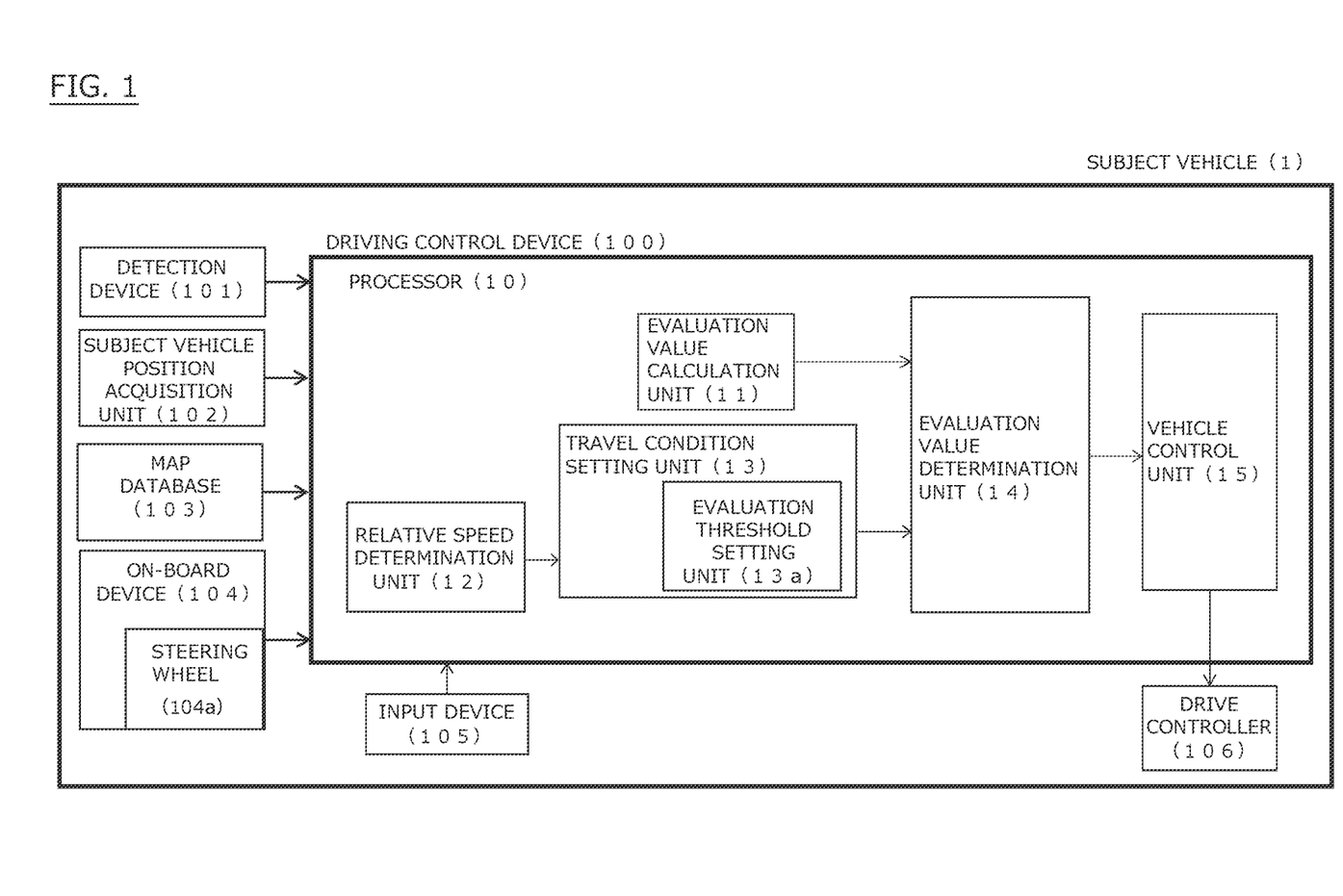
FIG. 1 is a block diagram illustrating a configuration of a driving control device according to an embodiment.

FIG. 1 is a block diagram illustrating a configuration of a subject vehicle 1 and a driving control device 100 that controls autonomous driving of the subject vehicle 1. The subject vehicle 1 includes the driving control device 100, a detection device 101, a subject vehicle position acquisition unit 102, a map database 103, on-board devices 104, an input device 105, and a drive controller 106.

The driving control device 100 executes a program stored in a ROM by a CPU, thereby autonomously controlling the vehicle speed and steering of the subject vehicle 1 by an autonomous travel control function. The driving control device 100 can set a driving mode corresponding to a driving assistance level, and can assist the travel of the subject vehicle according to the set driving mode. The driving assistance level indicates the degree of intervention when the driving control device 100 assists the driving of a vehicle by means of the autonomous travel control function. The driver's contribution to the driving of the vehicle decreases as the driving assistance level increases. Specifically, the driving assistance level can be set to levels 0 to 5 using the definitions or the like based on SAE J3016 of the Society of Automotive Engineers (SAE). In the level 0, all of the driving operations of the subject vehicle are carried out manually by a driver. In the level 1, although the driving operations of the subject vehicle are primarily carried out by means of manual driving of the driver, the driving control device 100 appropriately assists the manual driving of the driver by means of any of functions such as automatic braking, following, and lane keeping. In the level 2, although the driving operations of the subject vehicle are primarily carried out by means of the manual driving of the driver, under specific conditions, the driving control device 100 can combine a plurality of functions from among an automatic brake function, a following function, a lane keeping function, and the like, thereby executing driving assistance. In the level 3, the driving control device 100 executes all of the driving tasks, but the driver must resume control and be prepared to drive manually when requested by the driving control device 100. In the level 4, the manual driving by the driver is not required, and the driving control device 100 can execute all of the driving tasks and monitor the surrounding conditions of the subject vehicle under specific conditions. In the level 5, the driving control device 100 can execute all of the driving tasks under all conditions.

The driving mode corresponding to the level 2 is an eyes-on mode. That is, when the driving assistance level is set to the level 2, the driver needs to visually monitor the surrounding conditions of the subject vehicle 1. When the driving assistance level is set to the level 2, the face direction and the eye movement of the driver are monitored by an in-vehicle camera or the like, and the subject vehicle 1 is allowed to travel when the driver visually confirms the front. Additionally, the driving mode corresponding to the level 2 is a hands-on mode. The hands-on mode is a mode in which autonomous steering control by a processor 10 does not operate when the driver is not holding a steering wheel 104a. Whether the driver is holding the steering wheel 104a is detected by a touch sensor (not illustrated) provided on the steering wheel 104a or a steering torque sensor (not illustrated) of EPS.

The "driver holding the steering wheel 104a" includes not only a state in which the driver is firmly gripping the steering wheel 104a, but also a state in which the driver is lightly touching the steering wheel 104a.

On the other hand, the driving mode corresponding to the level 3 is an eyes-off mode. That is, when the driving assistance level is set to the level 3, the processor 10 controls the driving of the subject vehicle 1 by the eyes-off mode which permits the subject vehicle 1 to travel in a state where the driver does not visually confirm the front. At this time, the system of the driving control device 100 uses a camera, a radar, or the like to autonomously monitor the surrounding conditions of the subject vehicle. Additionally, the driving mode corresponding to the level 3 is a hands-off mode. The hands-off mode is a mode in which steering control by the processor 10 operates even if driver's hold on the steering wheel 104a is released. That is, when the driving assistance level is set to the level 3, the processor 10 controls the driving of the subject vehicle 1 by the hands-off mode which permits the subject vehicle 1 to travel in a state where driver's hold on the steering wheel of the subject vehicle 1 is released.

The classification of the driving assistance levels is not limited to the classification according to the definitions of the Society of Automotive Engineers, and the driving assistance levels may be defined based on ISO/TC204 of the International Organization for Standardization (ISO). Further, the classification of the driving assistance levels may be defined by other criteria as long as they are appropriately classified in accordance with the degree of intervention of the driving control device 100.

The detection device 101 includes any one or both of a vehicle-mounted camera that photographs surroundings of the subject vehicle 1 or a radar that detects other vehicles and obstacles around the subject vehicle. The detection result of the detection device 101 is output to the driving control device 100 at prescribed time intervals.

The subject vehicle position acquisition unit 102 includes a GPS unit, a gyro sensor, a vehicle speed sensor, and the like. The subject vehicle position acquisition unit 102 detects radio waves transmitted from a plurality of communication satellites by means of the GPS unit, periodically acquires position information about the subject vehicle 1, and detects the current location of the subject vehicle 1 based on the acquired position information about the subject vehicle 1, angle change information acquired from the gyro sensor, and the vehicle speed acquired from the vehicle speed sensor. The position information about the subject vehicle 1 detected by the subject vehicle position acquisition unit 102 is output to the driving control device 100 at prescribed time intervals.

The map database 103 is a memory configured to store high-precision three-dimensional map information that includes position information about various facilities and specific points, and to be accessible from the driving control device 100. The map database 103 stores high-precision digital map information (high-precision map, dynamic map). The high-precision map information includes identification information about a plurality of lanes on roads. The map information of the map database 103 includes three-dimensional position information about curved roads and/or lanes as well as the sizes of the curves (for example, the curvature or the radius of curvature), merging points, branch points, and lane reduction locations. The high-precision map information also includes information regarding facilities, such as service areas and parking areas.

The on-board devices 104 are various devices mounted in the vehicle and function by means of the driver's operation. The on-board devices 104 include a steering wheel 104a. Further, examples of the other on-board devices 104 include an accelerator pedal, a brake pedal, a navigation device, turn signal indicators, wipers, lights, a horn, and other specific switches. When the driver operates the on-board devices 104, the information is output to the driving control device 100.

The input device 105 is a device such as a button switch through which input by means of a driver's manual operation is possible, a touch panel arranged on a display screen, or a microphone through which input by means of a driver's voice is possible.

Figure 2:
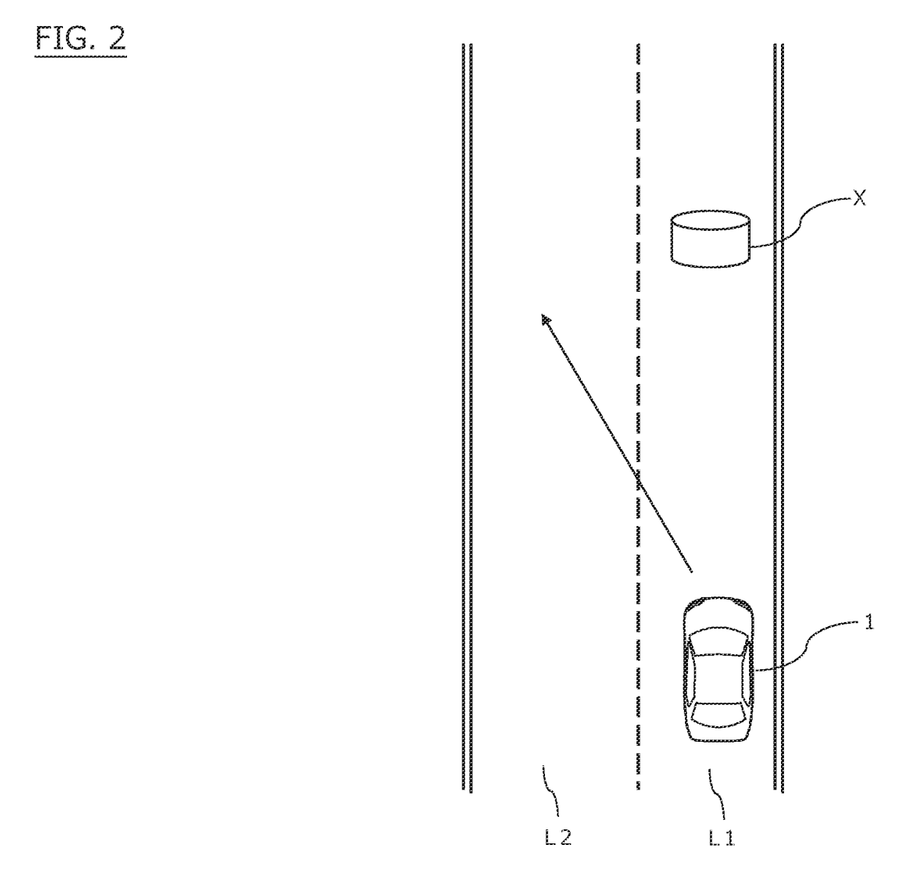
FIG. 2 is a diagram illustrating an example of a subject vehicle avoiding an obstacle ahead.

The drive controller 106 controls the operation of the subject vehicle 1 based on a control command from the driving control device 100. For example, the drive controller 106 controls the operation of a drive mechanism (including the operation of an internal combustion engine in a vehicle with an engine and the operation of a travel motor in an electric vehicle system, and including torque distribution between an internal combustion engine and a travel motor in a hybrid vehicle) and the braking operation for adjusting the acceleration/deceleration and the vehicle speed by means of an autonomous speed control function. Further, the drive controller 106 controls the operation of a steering actuator by means of an autonomous steering control function, thereby executing steering control of the subject vehicle. For example, the drive controller 106 detects a lane marker of a lane in which the subject vehicle travels and controls the travel position (lateral position) of the subject vehicle in the road width direction so that the subject vehicle travels in the center of the lane. Further, the drive controller 106 controls overtaking of a vehicle traveling ahead of the subject vehicle, changes in the travel direction of the subject vehicle, and the like. Further, the drive controller 106 carries out travel control for turning right or left at an intersection or the like. Further, other known methods can be used as the travel control method carried out by the drive controller 106. As illustrated in FIG. 2, the drive controller 106 executes the steering control of the subject vehicle 1 according to a control command of the processor 10 such that the subject vehicle 1 avoids an obstacle X ahead. That is, the driving control device 100 controls the driving of the subject vehicle 1 using the processor 10 such that the subject vehicle 1 avoids the obstacle X ahead.

Next, the configuration of the driving control device 100 will be described in detail with reference to FIGS. 1 to 4.

In the following description, a "predetermined driving assistance level" is set to the level 3, but is not limited to this. The processor 10 can set a driving mode corresponding to another driving assistance level in addition to the level 3.

As illustrated in FIG. 1, the driving control device 100 includes the processor 10. The processor 10 includes the Read Only Memory (ROM) that stores a program for controlling the driving of the subject vehicle 1, the Central Processing Unit (CPU) that executes the program stored in this ROM, and a Random Access Memory (RAM) that functions as an accessible storage device. As an operating circuit, a Micro Processing Unit (MPU), a Digital Signal Processor (DSP), an Application Specific Integrated Circuit (ASIC), a Field Programmable Gate Array (FPGA), and the like can be used in place of or in addition to the Central Processing Unit (CPU). The processor 10 includes an evaluation value calculation unit 11, a relative speed determination unit 12, a travel condition setting unit 13, an evaluation value determination unit 14, and a vehicle control unit 15. The evaluation value calculation unit 11, the relative speed determination unit 12, the travel condition setting unit 13, the evaluation value determination unit 14, and the vehicle control unit 15 execute programs for achieving the respective functions of the processor 10.

While the driving control device 100 is mounted in the subject vehicle 1 in FIG. 1, it is not limited thereto, and the driving control device 100 may be a device that remotely operates the subject vehicle 1.

The evaluation value calculation unit 11 calculates an evaluation value that indicates a sufficiency level of a travel condition for permitting the subject vehicle 1 to travel at a predetermined driving assistance level (for example, the level 3). The travel condition is, for example, that the subject vehicle 1 is traveling at a predetermined set speed or less. In this example, the evaluation value calculation unit 11 calculates the evaluation value such that an evaluation value corresponding to a second vehicle speed lower than a first vehicle speed is higher than an evaluation value corresponding to the first vehicle speed of the subject vehicle 1. That is, the evaluation value calculation unit 11 calculates the evaluation value to be higher as a vehicle speed V1 of the subject vehicle 1 decreases.

Figure 3:
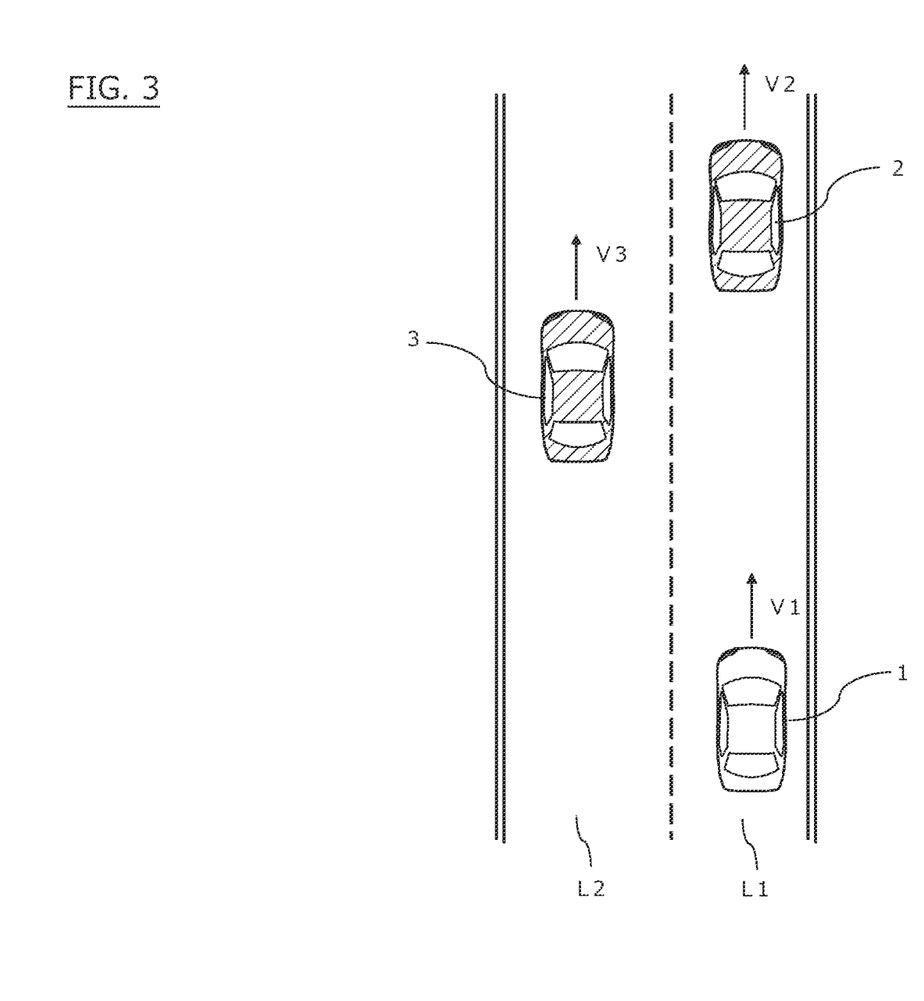
FIG. 3 is a diagram illustrating an example of a positional relation between the subject vehicle, a preceding vehicle, and an adjacent other vehicle.

The travel condition for permitting the subject vehicle 1 to travel at the predetermined driving assistance level may be, for example, that the subject vehicle 1 is traveling behind a preceding vehicle 2 as illustrated in FIG. 3. In this example, the evaluation value calculation unit 11 calculates the evaluation value such that an evaluation value corresponding to a second inter-vehicular distance shorter than a first inter-vehicular distance is higher than an evaluation value corresponding to the first inter-vehicular distance based on an inter-vehicular distance between the subject vehicle 1 and the preceding vehicle 2. That is, the evaluation value calculation unit 11 calculates the evaluation value to be higher as the inter-vehicular distance between the subject vehicle 1 and the preceding vehicle 2 becomes shorter. The evaluation value calculation unit 11 may calculate the evaluation value such that an evaluation value corresponding to a second elapsed time shorter than a first elapsed time is higher than an evaluation value corresponding to the first elapsed time based on an elapsed time after the detection of the preceding vehicle 2. That is, the evaluation value calculation unit 11 calculates the evaluation value to be higher as the elapsed time after the detection of the preceding vehicle 2 becomes shorter because a possibility of an obstacle present on a route on which the preceding vehicle 2 has already traveled is low.

Note that the "subject vehicle 1 traveling behind the preceding vehicle 2" includes not only a state in which the subject vehicle 1 travels by following the preceding vehicle 2, but also a state in which the subject vehicle 1 travels behind the preceding vehicle 2 on a travel route on which the preceding vehicle 2 has already traveled without following the preceding vehicle 2.

The travel condition for permitting the subject vehicle 1 to travel at the predetermined driving assistance level may be, in addition to the above-described conditions, that the subject vehicle 1 is traveling on a road for which using high-precision map information is effective, that Global Navigation Satellite System (GNSS) signals are effective, that the driver visually confirms the front, that there are no toll booths, motorway exits, merging points, intersections, or lane reduction points in the vicinity of the current location (for example, within about 800 m ahead), that there are no sharp curves of 100 R or less in the vicinity of the current location (for example, within about 500 m ahead), and the like. The evaluation value calculation unit 11 calculates the evaluation value indicating the sufficiency level of the travel condition for permitting the subject vehicle 1 to travel at the predetermined driving assistance level based on one or a plurality of conditions among the above-described conditions. For example, the evaluation value calculation unit 11 may calculate the sufficiency level for each of the plurality of conditions described above, and sum up the calculated sufficiency levels to calculate the evaluation value.

When the detection device 101 detects an adjacent other vehicle 3 traveling in a second lane L2 as illustrated in FIG. 3, the relative speed determination unit 12 compares the vehicle speed V1 of the subject vehicle 1 with a vehicle speed V3 of the adjacent other vehicle 3 to determine whether a relative speed of the adjacent other vehicle 3 to the subject vehicle 1 is equal to or less than a predetermined speed difference threshold. The relative speed of the adjacent other vehicle 3 to the subject vehicle 1 is an absolute value of a speed difference between the vehicle speed V1 of the subject vehicle 1 and the vehicle speed V3 of the adjacent other vehicle 3. The speed difference threshold is set based on whether the subject vehicle 1 comes to be able to travel behind the adjacent other vehicle 3 while keeping a predetermined inter-vehicular distance within a predetermined time by acceleration/deceleration control when the subject vehicle 1 changes the lane to the second lane L2. The relative speed determination unit 12 may calculate an average vehicle speed of a plurality of the adjacent other vehicles 3 as the vehicle speed V3 of the adjacent other vehicle 3 when the plurality of adjacent other vehicles 3 are detected. When there are adjacent lanes (second lanes) on the right and left of the first lane L1, the relative speed determination unit 12 selects the vehicle speed V3 of the adjacent other vehicle 3 traveling at a vehicle speed closest to the vehicle speed V1 of the subject vehicle 1 among the adjacent other vehicles 3 traveling in the plurality of second lanes L2, thereby calculating the relative speed.

Figure 4:
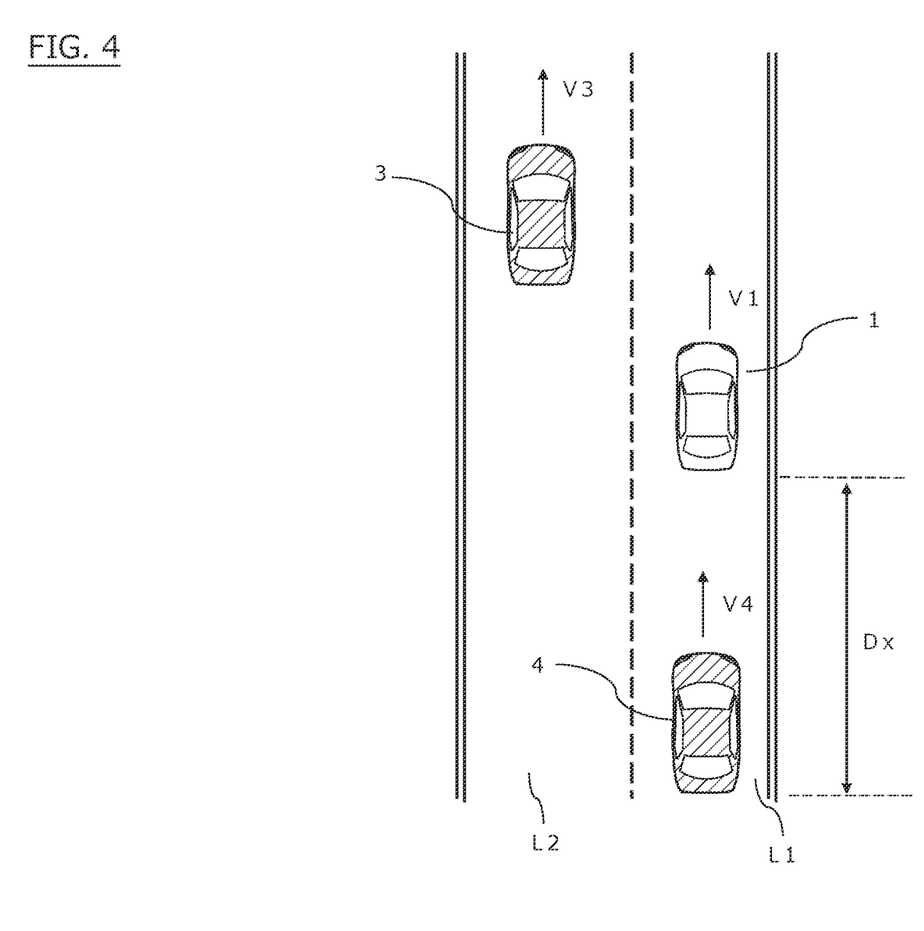
FIG. 4 is a diagram illustrating an example of a positional relation between the subject vehicle, the adjacent other vehicle, and a rear other vehicle.

When a rear other vehicle 4 is present within a predetermined distance behind the subject vehicle 1 as illustrated in FIG. 4, the relative speed determination unit 12 selects and sets a second speed difference threshold lower than a first speed difference threshold in a case where the rear other vehicle 4 is not present as the speed difference threshold. That is, the relative speed determination unit 12 sets the speed difference threshold to be lower when the rear other vehicle 4 is present within the predetermined distance behind the subject vehicle 1 than when the rear other vehicle 4 is not present. The predetermined distance is an upper limit value of the inter-vehicular distance at which the acceleration/deceleration of the subject vehicle 1 is expected to affect the rear other vehicle 4.

The travel condition setting unit 13 sets the travel condition for permitting the subject vehicle 1 to travel at the predetermined driving assistance level depending on whether the relative speed of the adjacent other vehicle 3 to the subject vehicle 1 is equal to or less than the predetermined speed difference threshold. The travel condition setting unit 13 includes an evaluation threshold setting unit 13*a*. The evaluation threshold setting unit 13*a* sets an evaluation threshold as a criterion for determining whether to allow the subject vehicle 1 to change the lane from the first lane L1 to the second lane L2 at the predetermined driving assistance level. That is, the evaluation threshold setting unit 13*a* sets a condition for allowing the subject vehicle 1 to change the lane from the first lane L1 to the second lane L2 at the predetermined driving assistance level, and sets a value corresponding to the set condition as the evaluation threshold. When the relative speed of the adjacent other vehicle 3 to the subject vehicle 1 is equal to or less than the speed difference threshold, the evaluation threshold setting unit 13*a* selects and sets a second evaluation threshold lower than a first evaluation threshold in a case where the relative speed is higher than the speed difference threshold as the evaluation threshold. That is, when the relative speed of the adjacent other vehicle 3 to the subject vehicle 1 is equal to or less than the speed difference threshold, the evaluation threshold setting unit 13*a* relaxes the travel condition for permitting the subject vehicle 1 to travel at the predetermined driving assistance level compared with the case where the relative speed is higher than the speed difference threshold. Specifically, when the evaluation threshold setting unit 13a sets the vehicle speed V1 of the subject vehicle 1 being equal to or less than the predetermined set speed as the travel condition for permitting the subject vehicle 1 to travel at the predetermined driving assistance level, the evaluation threshold setting unit 13a sets a set speed (for example, 65 km/h) when the relative speed is equal to or less than the speed difference threshold to be higher than a set speed (for example, 60 km/h) when the relative speed is higher than the speed difference threshold. That is, when the relative speed of the adjacent other vehicle 3 to the subject vehicle 1 is equal to or less than the speed difference threshold, the travel condition setting unit 13 relaxes the travel condition for permitting the subject vehicle 1 to travel at the predetermined driving assistance level.

Note that "allowing the subject vehicle 1 to change the lane from the first lane L1 to the second lane L2 at the predetermined driving assistance level" means that the driving control device 100 controls the driving of the subject vehicle 1 traveling in the first lane L1 at the predetermined driving assistance level, and causes the subject vehicle 1 to change the lane from the first lane L1 to the second lane L2 while maintaining the predetermined driving assistance level when the lane change is necessary.

The evaluation value determination unit 14 compares the evaluation value calculated by the evaluation value calculation unit 11 with the evaluation threshold set by the evaluation threshold setting unit 13a to determine whether the evaluation value is higher than the evaluation threshold. Specifically, when the evaluation threshold setting unit 13a sets the vehicle speed V1 of the subject vehicle 1 being equal to or less than the predetermined set speed as the condition for permitting the subject vehicle 1 to change the lane at the predetermined driving assistance level, the evaluation value determination unit 14 determines that the evaluation value is higher than the evaluation threshold when the vehicle speed V1 of the subject vehicle 1 becomes the set speed or less.

The evaluation value determination unit 14 may determine whether the inter-vehicular distance between the subject vehicle 1 and the preceding vehicle 2 is equal to or less than a predetermined set inter-vehicular distance, and determine that the evaluation value is higher than the evaluation threshold when the inter-vehicular distance is equal to or less than the predetermined set inter-vehicular distance. The evaluation threshold setting unit 13a sets a set inter-vehicular distance when the relative speed is equal to or less than the speed difference threshold to be longer than a set inter-vehicular distance when the relative speed is higher than the speed difference threshold.

The evaluation value determination unit 14 may determine whether the elapsed time after the detection of the preceding vehicle 2 by the detection device 101 is longer than a predetermined set elapsed time, and determine that the evaluation value is higher than the evaluation threshold when the elapsed time is longer than the set elapsed time. The evaluation threshold setting unit 13a sets a set elapsed time when the relative speed is equal to or less than the speed difference threshold to be shorter than a set elapsed time when the relative speed is higher than the speed difference threshold.

The vehicle control unit 15 illustrated in FIG. 1 permits the subject vehicle 1 to travel at the predetermined driving assistance level when the evaluation value is higher than the evaluation threshold. That is, the vehicle control unit 15 allows the subject vehicle 1 to change the lane from the first lane L1 to the second lane L2 at the predetermined driving assistance level when the evaluation value is higher than the evaluation threshold. Specifically, when the evaluation value is higher than the evaluation threshold, the vehicle control unit 15 controls the driving of the subject vehicle 1 traveling in the first lane L1 at the predetermined driving assistance level regardless of the presence or absence of the preceding vehicle 2. Then, for example, when the obstacle X is detected ahead of the subject vehicle 1 as illustrated in FIG. 2, the vehicle control unit 15 causes the subject vehicle 1 to change the lane from the first lane L1 to the second lane L2 while maintaining the predetermined driving assistance level. This allows the subject vehicle 1 to avoid the obstacle X at the predetermined driving assistance level. While the vehicle control unit 15 executes lane-change control of the subject vehicle 1 such that the subject vehicle 1 after the lane change travels behind the adjacent other vehicle 3, it is not limited to this, and the vehicle control unit 15 may control the subject vehicle 1 such that it travels ahead of the adjacent other vehicle 3. The vehicle control unit 15 may cause the subject vehicle 1 to change the lane from the second lane L2 to the first lane L1 again after the execution of the lane-change control of the subject vehicle 1. Meanwhile, when the evaluation value is equal to or less than the evaluation threshold, the vehicle control unit 15 does not permit the subject vehicle 1 to travel at the predetermined driving assistance level. Therefore, when the obstacle X is detected ahead, the subject vehicle 1 avoids the obstacle X at a driving assistance level (for example, the level 2) lower than the predetermined driving assistance level.

When the adjacent other vehicle 3 is traveling ahead of the subject vehicle 1 as illustrated in FIGS. 3 and 4, the vehicle control unit 15 controls the vehicle speed V1 of the subject vehicle 1 traveling in the first lane L1 such that the relative speed of the adjacent other vehicle 3 to the subject vehicle 1 is equal to or less than the speed difference threshold. That is, the vehicle control unit 15 controls the vehicle speed V1 of the subject vehicle 1 such that the relative speed of the adjacent other vehicle 3 to the subject vehicle 1 is maintained at the speed difference threshold or less. In the case of controlling the vehicle speed V1 such that the relative speed is equal to or less than the speed difference threshold, the vehicle control unit 15 controls the driving of the subject vehicle 1 such that there is no other vehicle traveling side by side with the subject vehicle 1.

The processor 10 may set the travel condition depending on whether the relative speed of the adjacent other vehicle 3 to the subject vehicle 1 is equal to or less than the predetermined speed difference threshold without setting the evaluation threshold. The processor 10 may determine whether a traveling environment of the subject vehicle 1 meets the travel condition without calculating the evaluation value.

Next, a procedure of a driving control method executed by the driving control device 100 will be described using the flowchart illustrated in FIG. 5.

Figure 5:
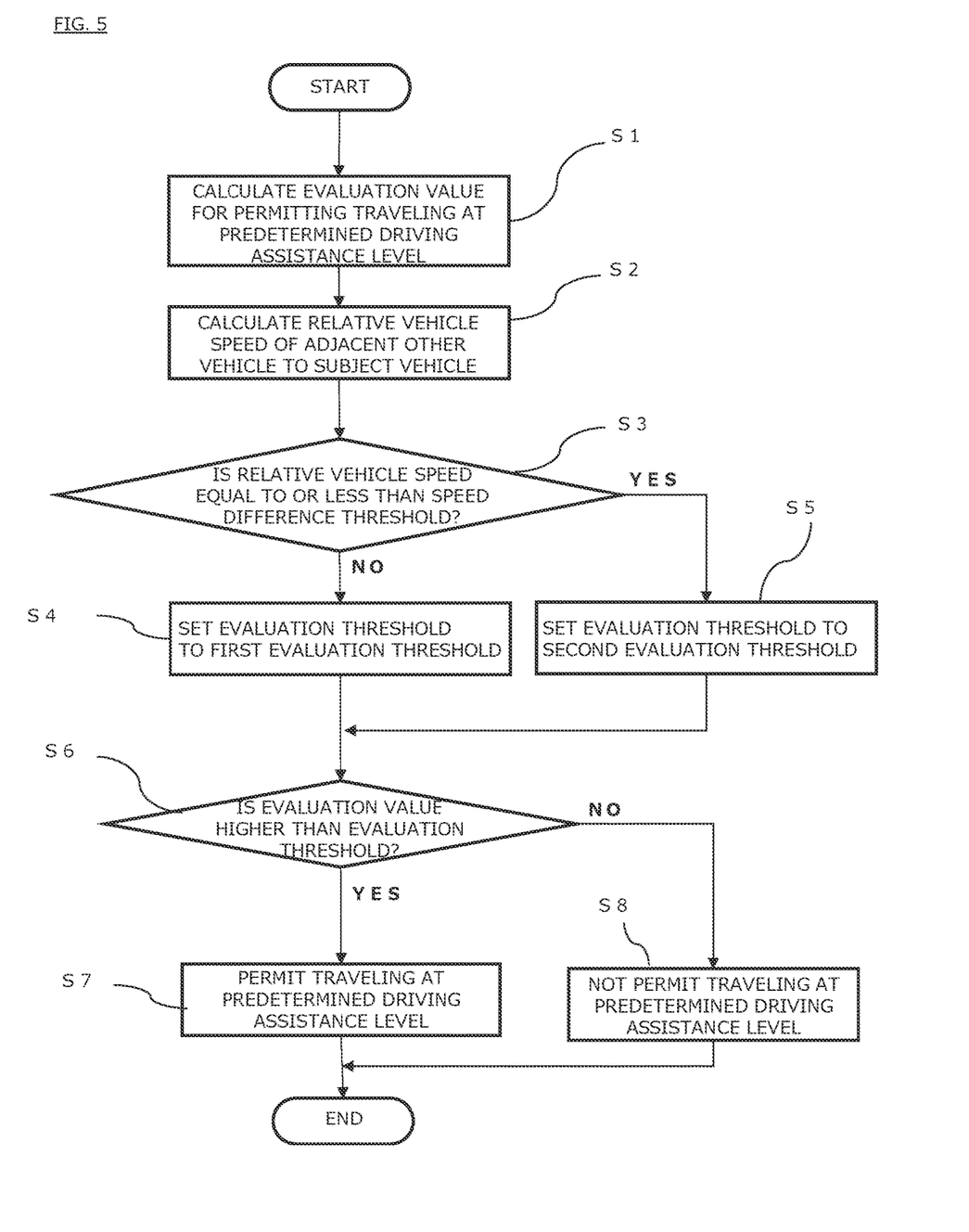
FIG. 5 is a flowchart illustrating a procedure of a driving control method executed by the driving control device illustrated in FIG. 1.

As illustrated in FIG. 5, in Step S1, the evaluation value calculation unit 11 of the processor 10 calculates the evaluation value that indicates the sufficiency level of the travel condition for permitting the subject vehicle 1 to travel at the predetermined driving assistance level.

Next, in Step S2, the relative speed determination unit 12 calculates the relative speed of the adjacent other vehicle 3 to the subject vehicle 1 based on the vehicle speed V3 of the adjacent other vehicle 3 acquired by the detection device 101.

Next, in Step S3, the relative speed determination unit 12 determines whether the relative speed calculated in Step S2 is equal to or less than the speed difference threshold. When it is determined that the relative speed is not equal to or less than the speed difference threshold, that is, the relative speed is higher than the speed difference threshold in Step S3, the evaluation threshold setting unit 13a selects and sets the first evaluation threshold as the evaluation threshold in Step S4. Meanwhile, when it is determined that the relative speed is equal to or less than the speed difference threshold in Step S3, the evaluation threshold setting unit 13a selects and sets the second evaluation threshold lower than the first evaluation threshold as the evaluation threshold in Step S5.

Next, in Step S6, the evaluation value determination unit 14 determines whether the evaluation value is higher than the evaluation threshold. When the evaluation value is higher than the evaluation threshold, the vehicle control unit 15 permits the subject vehicle 1 to travel at the predetermined driving assistance level in Step S7. That is, in Step S7, the vehicle control unit 15 allows the subject vehicle 1 to change the lane from the first lane L1 to the second lane L2 at the predetermined driving assistance level. Meanwhile, when the evaluation value is equal to or less than the evaluation threshold, the vehicle control unit 15 does not permit the subject vehicle 1 to travel at the predetermined driving assistance level in Step S8. That is, when the evaluation value is equal to or less than the evaluation threshold, the driving control device 100 controls the driving of the subject vehicle 1 at a level (for example, the level 2) lower than the predetermined driving assistance level when the subject vehicle 1 changes the lane from the first lane L1 to the second lane L2.

As described above, the processor 10 of the driving control device 100 according to the embodiment compares the vehicle speed V1 of the subject vehicle 1 traveling in the first lane L1 with the vehicle speed V3 of the adjacent other vehicle 3 traveling in the second lane L2, and determines whether the relative speed of the adjacent other vehicle 3 to the subject vehicle 1 is equal to or less than the predetermined speed difference threshold. Then, when the relative speed is equal to or less than the speed difference threshold, the processor 10 relaxes the travel condition for permitting the subject vehicle 1 to travel at the predetermined driving assistance level. This allows the driving control device 100 to execute the driving control of the subject vehicle 1 at a driving assistance level corresponding to a traveling environment of the second lane L2 as the adjacent lane. That is, the driving control device 100 can increase an opportunity to set the predetermined driving assistance level. For example, in an emergency, such as a case where there is an obstacle X ahead of the subject vehicle 1 traveling in the first lane L1 as illustrated in FIG. 2, the driving control device 100 can execute the lane-change control of the subject vehicle 1 at the predetermined driving assistance level according to the traveling environment (relative speed of the adjacent other vehicle 3 to the subject vehicle 1) of the second lane L2. Therefore, the subject vehicle 1 can travel by smoothly avoiding the obstacle X.

The processor 10 of the driving control device 100 calculates the evaluation value that indicates the sufficiency level of the travel condition for permitting the subject vehicle 1 to travel at the predetermined driving assistance level. The processor 10 selects the second evaluation threshold lower than the first evaluation threshold in the case where the relative speed of the adjacent other vehicle 3 to the subject vehicle 1 is higher than the speed difference threshold as the evaluation threshold, and permits the subject vehicle 1 to travel at the predetermined driving assistance level when the evaluation value is higher than the evaluation threshold. Therefore, the driving control device 100 can allow the subject vehicle 1 to change the lane from the first lane L1 to the second lane L2 at the predetermined driving assistance level when the evaluation value is higher than the evaluation threshold. Accordingly, when there is an obstacle X ahead of the subject vehicle 1 traveling in the first lane L1 as illustrated in FIG. 2, the subject vehicle 1 can travel by smoothly avoiding the obstacle X while maintaining the predetermined driving assistance level. The driving control device 100 can determine whether to permit the subject vehicle 1 to travel at the predetermined driving assistance level based on the specific comparison between the evaluation value and the evaluation threshold.

When the rear other vehicle 4 is present within a predetermined distance Dx behind the subject vehicle 1, the processor 10 of the driving control device 100 selects the second speed difference threshold lower than the first speed difference threshold in the case where the rear other vehicle 4 is not present as the speed difference threshold. This allows the driving control device 100 to suppress the traveling of the subject vehicle 1 at the predetermined driving assistance level by making the condition for determining that the relative speed is equal to or less than the speed difference threshold strict when there is a possibility that the acceleration/deceleration of the subject vehicle 1 affects the rear other vehicle 4.

The processor 10 of the driving control device 100 controls the vehicle speed V1 of the subject vehicle 1 such that the relative speed of the adjacent other vehicle 3 to the subject vehicle 1 is equal to or less than the speed difference threshold when the adjacent other vehicle 3 is traveling ahead of the subject vehicle 1. Accordingly, since the driving control device 100 controls the vehicle speed V1 of the subject vehicle 1 while maintaining the relative speed at the speed difference threshold or less, the subject vehicle 1 can change the lane to the second lane L2 without large acceleration/deceleration, for example, when the obstacle X is detected ahead.

The processor 10 of the driving control device 100 calculates the evaluation value such that the evaluation value corresponding to the second vehicle speed of the subject vehicle 1 lower than the first vehicle speed is higher than the evaluation value corresponding to the first vehicle speed of the subject vehicle 1. This allows the driving control device 100 to more easily permit the subject vehicle 1 to travel at the predetermined driving assistance level as the vehicle speed V1 of the subject vehicle 1 decreases. That is, the subject vehicle 1 more easily changes the lane at the predetermined driving assistance level as the vehicle speed V1 of the subject vehicle 1 decreases, for example, when the obstacle X is detected ahead.

The processor 10 of the driving control device 100 may calculate the evaluation value such that the evaluation value corresponding to the second inter-vehicular distance shorter than the first inter-vehicular distance is higher than the evaluation value corresponding to the first inter-vehicular distance based on the inter-vehicular distance between the subject vehicle 1 and the preceding vehicle 2. This allows the driving control device 100 to more easily permit the subject vehicle 1 to travel at the predetermined driving assistance level as the inter-vehicular distance between the subject vehicle 1 and the preceding vehicle 2 decreases. That is, the subject vehicle 1 more easily changes the lane at the predetermined driving assistance level as the inter-vehicular distance between the subject vehicle 1 and the preceding vehicle 2 decreases, for example, when the obstacle X is detected ahead.

The processor 10 of the driving control device 100 may calculate the evaluation value such that the evaluation value corresponding to the second inter-vehicular distance shorter than the first inter-vehicular distance is higher than the evaluation value corresponding to the first inter-vehicular distance based on the elapsed time after the detection of the preceding vehicle 2 ahead of the subject vehicle 1. This allows the driving control device 100 to more easily permit the subject vehicle 1 to travel at the predetermined driving assistance level as the elapsed time after the detection of the preceding vehicle 2 decreases. That is, the subject vehicle 1 more easily changes the lane at the predetermined driving assistance level as the elapsed time after the detection of the preceding vehicle 2 decreases, for example, when the obstacle X is detected ahead.

The processor 10 of the driving control device 100 calculates the average vehicle speed of the plurality of adjacent other vehicles 3 as the vehicle speed of the adjacent other vehicle 3 when the plurality of adjacent other vehicles 3 are detected. This allows the driving control device 100 to execute the driving control of the subject vehicle 1 at the driving assistance level corresponding to the traveling environment of the second lane L2 based on the vehicle speeds of the plurality of adjacent other vehicles 3.

The processor 10 of the driving control device 100 controls the driving of the subject vehicle 1 by the hands-off mode which permits the subject vehicle 1 to travel in the state where driver's hold on the steering wheel of the subject vehicle 1 is released when the driving of the subject vehicle 1 is controlled at the predetermined driving assistance level. This allows the driving control device 100 to reduce a driving load on the driver because the driving of the subject vehicle 1 is controlled by the hands-off mode when the driving of the subject vehicle 1 is controlled at the predetermined driving assistance level.

The processor 10 of the driving control device 100 controls the driving of the subject vehicle 1 by the eyes-off mode which permits the subject vehicle 1 to travel in the state where the driver does not visually confirm the front when the driving of the subject vehicle 1 is controlled at the predetermined driving assistance level. This allows the driving control device 100 to reduce a driving load on the driver because the driving of the subject vehicle 1 is controlled by the eyes-off mode when the driving of the subject vehicle 1 is controlled at the predetermined driving assistance level.

DESCRIPTION OF REFERENCE NUMERALS

1 Subject vehicle
3 Adjacent other vehicle
4 Rear other vehicle
100 Driving control device
10 Processor
11 Evaluation value calculation unit
12 Relative speed determination unit
13 Travel condition setting unit
15 Vehicle control unit
L1 First lane
L2 Second lane

The invention claimed is:

1. A driving control method for controlling driving of a subject vehicle using a processor such that the subject vehicle avoids an obstacle ahead, wherein the processor:

compares a vehicle speed of the subject vehicle traveling in a first lane with a vehicle speed of an adjacent other vehicle traveling in a second lane adjacent to the first lane to determine whether a relative speed of the adjacent other vehicle to the subject vehicle is equal to or less than a predetermined speed difference threshold; and relaxes a travel condition for permitting the subject vehicle to travel at a predetermined driving assistance level when the relative speed is equal to or less than the predetermined speed difference threshold.

2. The driving control method according to claim 1, wherein the processor:

calculates an evaluation value that indicates a sufficiency level of the travel condition;

selects a second evaluation threshold lower than a first evaluation threshold in a case where the relative speed is higher than the predetermined speed difference threshold as an evaluation threshold; and permits the subject vehicle to travel at the driving assistance level when the evaluation value is higher than the evaluation threshold.

3. The driving control method according to claim 2, wherein the processor selects a second speed difference threshold lower than a first speed difference threshold in a case where a rear other vehicle is not present as the predetermined speed difference threshold when the rear other vehicle is present within a predetermined distance behind the subject vehicle.

4. The driving control method according to claim 2, wherein the processor controls the vehicle speed of the subject vehicle such that the relative speed of the adjacent other vehicle to the subject vehicle is equal to or less than the predetermined speed difference threshold when the adjacent other vehicle is traveling ahead of the subject vehicle.

5. The driving control method according to claim 2, wherein the processor calculates the evaluation value such that the evaluation value corresponding to a second vehicle speed of the subject vehicle is higher than the evaluation value corresponding to a first vehicle speed of the subject vehicle, and the second vehicle speed is lower than the first vehicle speed.

6. The driving control method according to claim 2, wherein the processor calculates the evaluation value such that the evaluation value corresponding to a second inter-vehicular distance is higher than the evaluation value corresponding to a first inter-vehicular distance based on an inter-vehicular distance between the subject vehicle and a preceding vehicle traveling in the first lane, and the second inter-vehicular distance is shorter than the first inter-vehicular distance.

7. The driving control method according to claim 2, wherein the processor calculates the evaluation value such that the evaluation value corresponding to a second elapsed time is higher than the evaluation value corresponding to a first elapsed time when a preceding vehicle is detected ahead of the subject vehicle in the first lane, and the second elapsed time is shorter than the first elapsed time.

8. The driving control method according to claim 1, wherein the processor calculates an average vehicle speed of a plurality of adjacent other vehicles as the vehicle speed of the adjacent other vehicle when the plurality of the adjacent other vehicles are detected.

9. The driving control method according to claim 1, wherein, when the driving of the subject vehicle is controlled at the driving assistance level, the processor controls the driving of the subject vehicle by a hands-off mode which permits the subject vehicle to travel in a state where driver's hold on a steering wheel of the subject vehicle is released.

10. The driving control method according to claim 1, wherein, when the driving of the subject vehicle is controlled at the driving assistance level, the processor controls the driving of the subject vehicle by an eyes-off mode which permits the subject vehicle to travel in a state where a driver does not visually confirm a front.

11. A driving control device that controls driving of a subject vehicle using a processor such that the subject vehicle avoids an obstacle ahead, the processor comprising:
   relative speed determination unit configured to compare a vehicle speed of the subject vehicle traveling in a first lane with a vehicle speed of an adjacent other vehicle traveling in a second lane adjacent to the first lane to determine whether a relative speed of the adjacent other vehicle to the subject vehicle is equal to or less than a predetermined speed difference threshold; and
   a travel condition setting unit configured to relax a travel condition for permitting the subject vehicle to travel at a predetermined driving assistance level when the relative speed is equal to or less than the predetermined speed difference threshold.

\* \* \* \* \*